Nov. 5, 1940.    S. J. HARLEY ET AL    2,220,648
PROFILE GENERATING MECHANISM
Filed July 17, 1939    9 Sheets-Sheet 3

Nov. 5, 1940. S. J. HARLEY ET AL 2,220,648
PROFILE GENERATING MECHANISM
Filed July 17, 1939 9 Sheets-Sheet 4

Nov. 5, 1940.　　　S. J. HARLEY ET AL　　　2,220,648
PROFILE GENERATING MECHANISM
Filed July 17, 1939　　　9 Sheets-Sheet 5

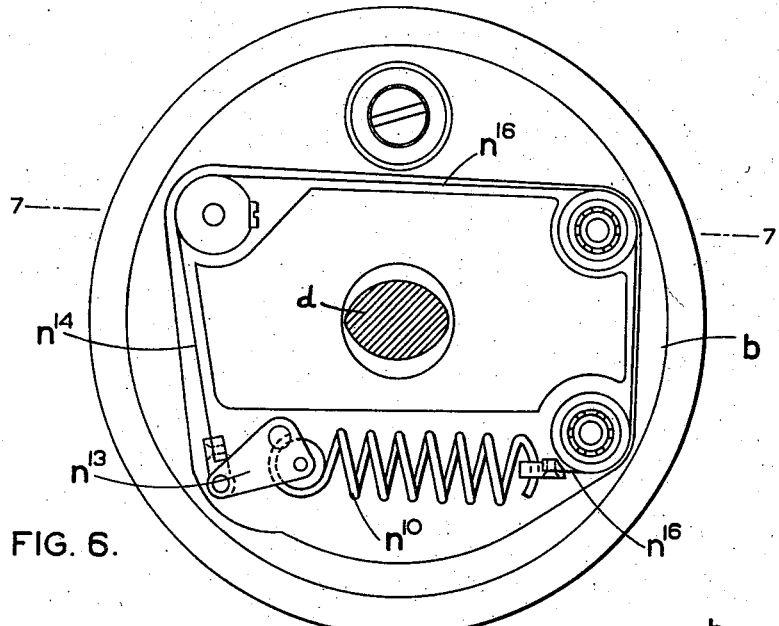
FIG. 6.
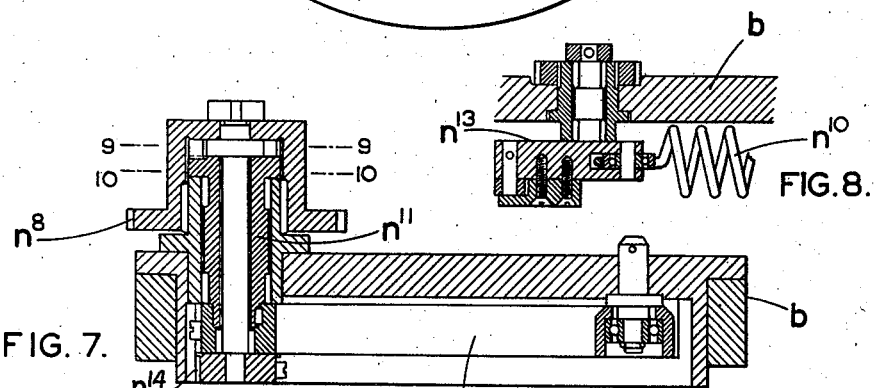
FIG. 7. FIG. 8.
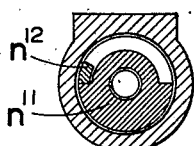
FIG. 9.
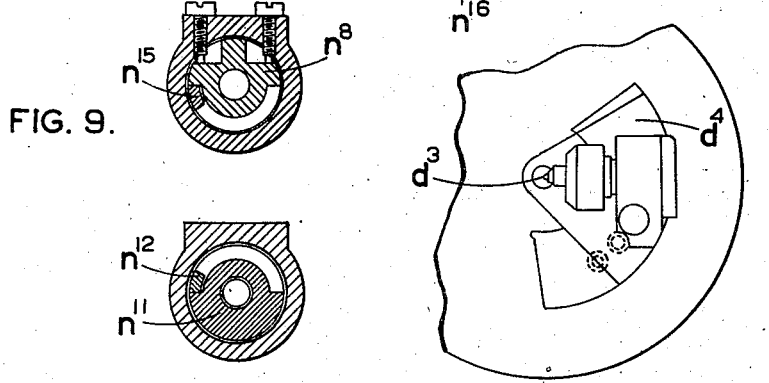
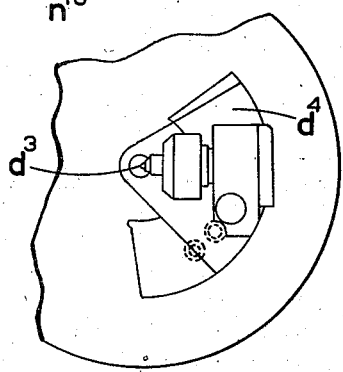
FIG. 10. FIG. 11.

Nov. 5, 1940. S. J. HARLEY ET AL 2,220,648
PROFILE GENERATING MECHANISM
Filed July 17, 1939  9 Sheets-Sheet 7

Nov. 5, 1940.  S. J. HARLEY ET AL  2,220,648
PROFILE GENERATING MECHANISM
Filed July 17, 1939   9 Sheets-Sheet 8

Patented Nov. 5, 1940

2,220,648

UNITED STATES PATENT OFFICE 2,220,648

PROFILE GENERATING MECHANISM

Stanley Jaffa Harley, Coventry, and George Olah, Birmingham, England

Application July 17, 1939, Serial No. 285,016
In Great Britain April 5, 1938

11 Claims. (Cl. 125—11)

This invention relates to mechanism for producing profiles and more particularly to mechanism for shaping and trueing the operative surface of grinding wheels used for form grinding.

The improved mechanism is of the kind in which the desired profile is generated by two component motions controlled by cams and comprises in combination a set of circular and rectilinear cams operating against circular or rectilinear surfaces and means, adapted for use alternatively or simultaneously, for varying the relative angular positions of the cams and/or the distance between their axes and the surfaces against which the cams operate, or the position of the diamond tool.

There may be a set of two or more cams for one or for both component motions, at least one of these cams for each component motion being circular or rectilinear. There may also be associated with a main circular cam one or more other cams capable of being set in different angular positions with respect to and around the axis of the said main cam.

The improved mechanism is especially adapted for use in the generation of rectilinear and curved profiles consisting of different rectilinear or curved portions, by the same set of cams in a single trueing operation, and includes the provision of means for independent adjustment and setting of the profile generating elements and for readjustment thereof merely by varying the setting and without changing the form of said elements. The use of generating elements having circular or rectilinear operating surfaces enables a higher degree of accuracy to be obtained in the finished profile than is at present possible with cams of non-circular or non-rectilinear form.

Of the two component motions one is an angular motion and the other a rectilinear or quasi-rectilinear motion. The angular component is represented by the oscillating motion of a frame around an axis perpendicular to the profile plane. The rectilinear component is represented by a diamond-carrying slide moving on the frame in a direction perpendicular to the axis of oscillation of the latter. This rectilinear component can be replaced by a quasi-rectilinear component represented by the oscillating motion of a diamond carrier in a plane at right angles to the plane of oscillation of the said frame. The bearings or centres about which the diamond carrier moves or oscillates are mounted on or in the frame.

In order to produce a prescribed profile it is necessary to co-ordinate these two components and the present invention includes improved alternative means for carrying out the following methods of co-ordination for the different portions of a composite profile.

(A) The control of the two components by means of two cams.

(B) The pantograph method in which a point or roll on the diamond carrier is caused to follow a prescribed path along the outlines of a master piece.

Further available methods of profile generation incorporated in the present invention are,—

(C) The exclusive use of the angular component for producing circular portions of the profile.

(D) The use of formed diamonds such as spherical diamonds for producing concave circular portions of the profile.

In the accompanying drawings:

Figure 6 is a transverse sectional view on the line 6—6 of Figure 1.

Figure 7 is a detail sectional view on the line 7—7 of Figure 6.

Figure 8 is a vertical sectional view of the member $n^{13}$ of Figure 6.

Figure 9 is a detail sectional view on the line 9—9 of Figure 7.

Figure 10 is a detail sectional view on the line 10—10 of Figure 7.

Figure 11 is an underside view of the diamond holder shown in Figure 3.

Figure 1:
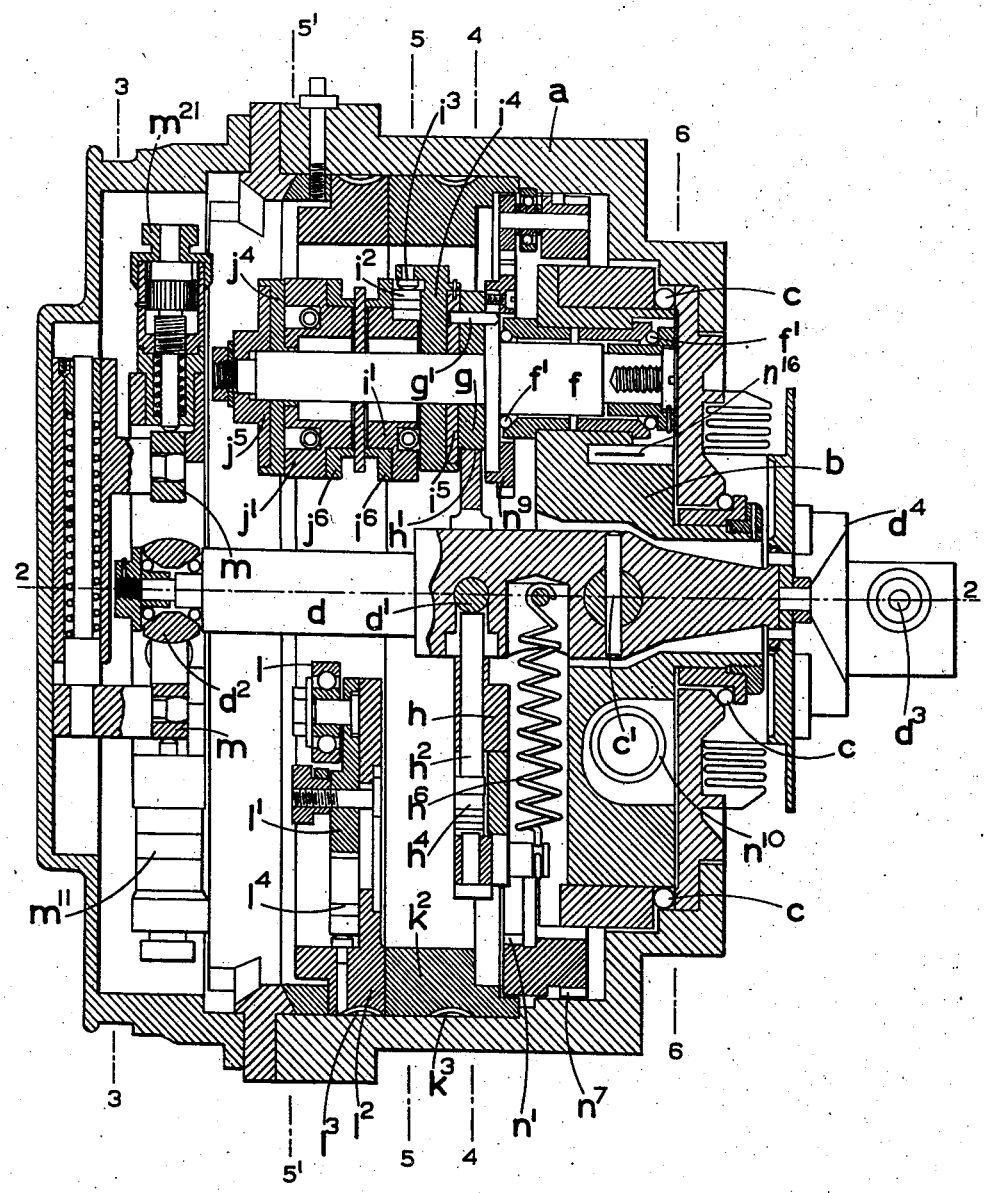
Figure 1 is a central sectional view of the improved mechanism taken on the line 1—1 of Figure 2.
Figure 2:
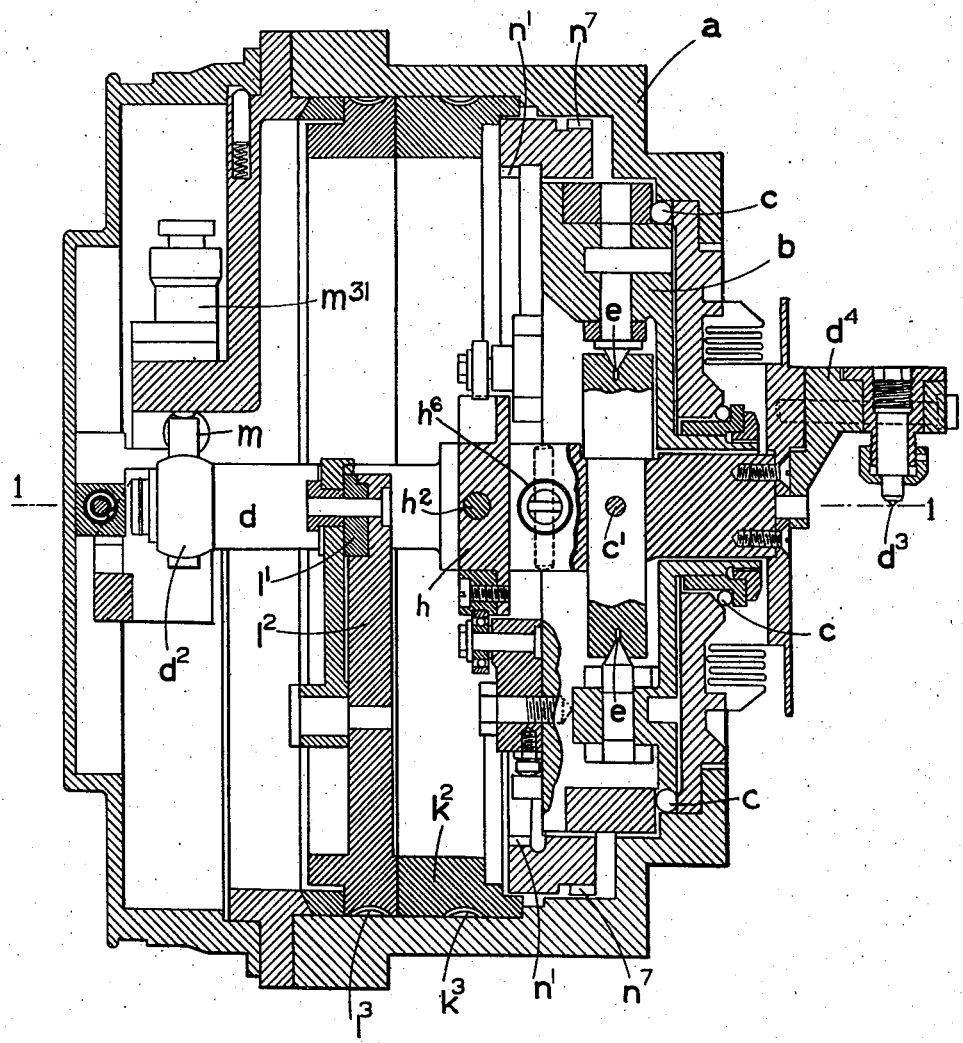
Figure 2 is a similar view on the line 2—2 of Figure 1.

Figures 12 to 17 inclusive show diagrammatically the relative positions of the various elements during six phases in the production of a screw thread profile.

Throughout the drawings like parts are designated by similar characters.

Referring to the drawings, $a$ represents a fixed housing enclosing the mechanism, $b$ a frame having an oscillatory motion in bearings $c$ in said housing. $d$ is a diamond-carrying member having a rocking or oscillating motion between centres $e, e$ fixed in said frame. $f$ is a cam-shaft rotatably mounted in bearings $f^1$ carried by said frame. $g$ is a cam for the rectilinear component motion of the diamond. $h$ is an intermediate member which is guided in frame $b$ along a rectilinear path for a purpose hereinafter described. $i$ and $j$ are cams for the angular component motion of the diamond. $k, l$ are rolls co-operating with the cams $i$ and $j$ respectively. $m$ collectively represents a set of master pieces for the pantograph action of the mechanism.

The two component motions of the profile producing process are respectively obtained by the oscillation of the frame $b$ aforesaid in bearings $c$ mounted in the fixed housing $a$, and the oscillation of the diamond carrier $d$ in centres $e, e$ mounted in said frame. The first component will be hereinafter referred to as the "angular component" and the second as the "rectilinear component" although in reality the latter is a quasi-rectilinear component only.

Figure 4:
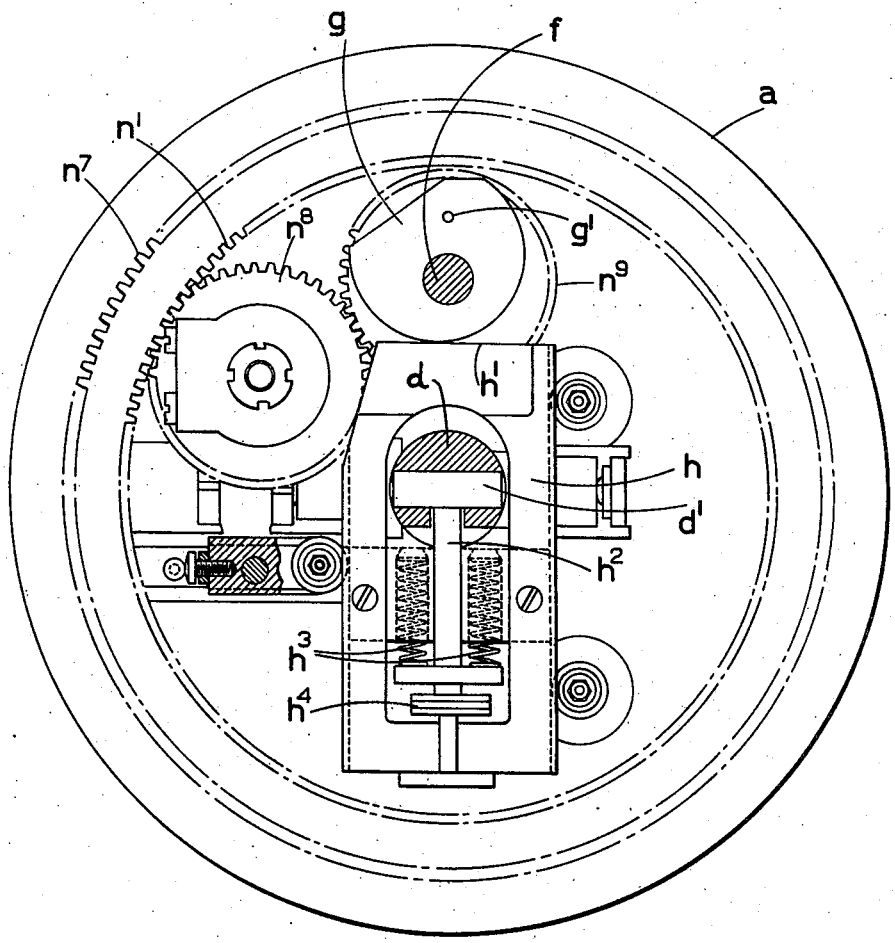
Figure 4 is a transverse sectional view on the line 4—4 of Figure 1.

The composite profile is produced by the continuous angular motion of an internal gear $n^1$ mounted in the fixed housing $a$ co-axially with the frame $b$, Figures 1 and 4. This gear can be driven by any suitable mechanical, hydraulic or electrical means.

Figure 5:
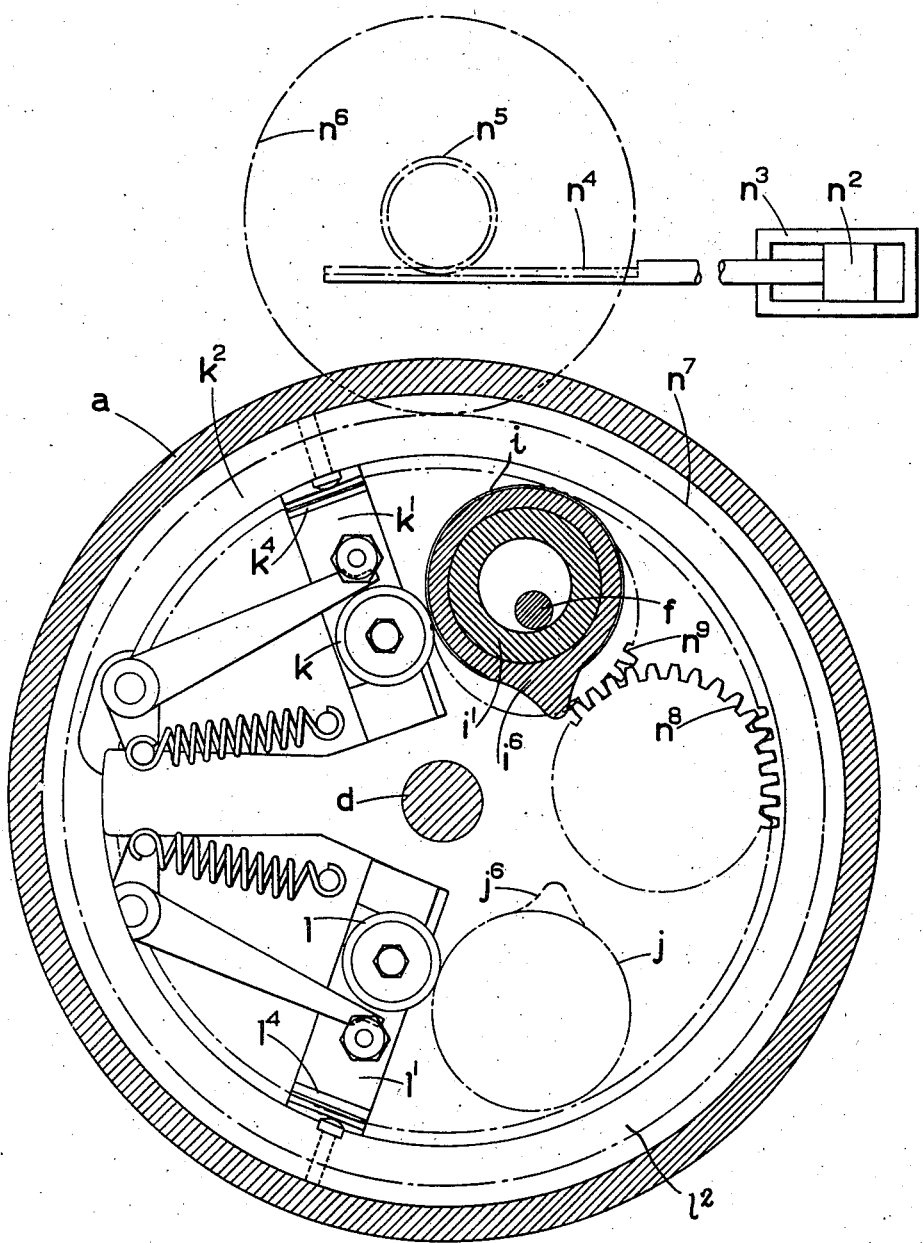
Figure 5 is a transverse sectional view in which the upper part is taken on the line 5—5 and the lower part on the line $5^1$—$5^1$ of Figure 1.

In the arrangement shown the internal gear $n^1$ is made integral with an external gear $n^7$ which is driven through intermediate gears $n^6$, $n^5$, Figure 5, from a rack $n^4$ connected with the piston $n^2$ of a hydraulic cylinder $n^3$.

Alternatively, an electro-magnetic arrangement may be employed, or a lead screw can be used for the same purpose in combination with mechanical or electrical actuating means. The rack-gear above referred to can, if required, be replaced by a worm gear drive actuated automatically or by hand. In any case the internal gear $n^1$ engages with an intermediate gear $n^8$ which itself engages with the gear $n^9$ keyed to the cam-shaft $f$, Figure 4.

The oscillation of the frame $b$ for the angular component motion of the profile producing process is controlled by the co-action between roll $k$ or $l$ adjustably mounted in the fixed housing $a$, Figure 5, and cam $i$ or $j$ secured to the cam-shaft $f$ which, as already stated, is rotatably mounted in bearings in the frame $b$ about an axis at right angles to the plane of oscillation of the latter. Contact of the cam $i$ with roll $k$ is obtained by the action of an external force tending to oscillate the frame $b$ together with the cam-shaft $f$ and cam $i$ in a counter-clockwise direction, thus pressing cam $i$ against roll $k$ which for a certain setting, is fixed in the housing $a$. To obtain a contact between cam $j$ and roll $l$ the external force acts clockwise. The means employed to produce this external force are hereinafter described.

When the cam-shaft $f$ is rotated in the frame $b$, by the driving members $n^2$, $n^4$, $n^5$, $n^6$, $n^7$, $n^8$, $n^9$, the cams co-act with their respective rolls fixed in the housing $a$ with the result that the cam axis is compelled to move towards or away from the rolls, that is to say, the cam axis and its carrying member, the frame $b$, receive an angular motion in the bearings $c$.

Unless the pantograph method B is used, the rectilinear or quasi-rectilinear component of the profile producing process is controlled by the third cam $g$ on the cam-shaft, Figures 1 and 4. This cam operates against the edge $h^1$ of an intermediate member $h$ carrying a contact pin $h^2$ which bears against a pin $d^1$ of the diamond carrier $d$ at a point on the side of the pivotal axis $c^1$ thereof remote from the diamond. For a given setting the intermediate member $h$ and contact pin $h^2$ are rigidly connected. The said intermediate member $h$ is pressed against the third cam $g$ aforesaid by means of a tension spring $h^6$ one end of which is attached to the said member whilst the other end is attached to the diamond carrier $d$ at a point between the pivotal axis thereof and the point at which the contact pin $h^2$ operates thereon. The re-action of the spring causes the diamond carrier to press against the contact pin. In this way the position of the said third cam determines the position of the diamond carrier about its pivotal axis.

The resulting oscillating movement of the diamond carrier $d$ about its axis in the frame $b$ will continue so long as it meets with no resistance in either direction exceeding the force of the spring $h^6$. The existence of such a resistance operates to interrupt the action of the third cam on the diamond carrier.

A resistance against a clockwise motion of the diamond carrier $d$ prevents the member $h$ from being pressed by spring $h^6$ against cam $g$ and thus interrupts the contact $g, h^1$. A resistance against an anticlockwise motion of the diamond carrier $d$ prevents a contact between pin $d^1$ and pin $h^2$. By interruption of one of these contacts $g, h^1$ or $h^2, d$ the control of the rectilinear component motion of cam $g$ is suspended.

A resistance cancelling the control of this cam $g$ occurs when the pantograph method (B) is employed for the production of certain parts of the profile. In this case the end of the diamond carrier $d$ remote from the diamond is furnished with a spherical roll $d^2$ and the arrangement is such that a straight line containing the centre of this roll and the diamond point $d^3$ passes through the point $c^1$ of intersection of the axes about which the frame $b$ and the diamond carrier $d$ respectively oscillate. This point of intersection occupies a fixed position with reference to the housing $a$. When the spherical roll $d^2$ is caused by the spring $h^6$ to make contact with the master piece $m$ and describes a path in accordance with the outline thereof, the diamond point describes a similar path on a reduced scale, the degree of reduction depending upon the relative distances of the roll and diamond from the centre of oscillation of the diamond carrier.

During that part of the profile producing process in which both components of the generating motion are controlled by cams, as aforesaid, the spherical roll $d^2$ moves between but is clear of the master pieces. The transition from the control of the diamond carrier by the third cam $g$ on the cam shaft to its control by the master pieces, i. e. in accordance with the pantograph method B, takes place automatically, contact of the spherical roll with the latter creating a resistance which interrupts the operation of the said third cam. During this period of the profile generating process the angular component is still controlled by the other cams $i, j$ on the cam-shaft co-acting with their respective rolls $k, l$ on the housing.

When producing portions of the profile in accordance with method (C), that is to say, by an angular motion of the frame $b$ only, the intermediate gear $n^8$ aforesaid is locked relative to the said frame and, since this gear is in constant mesh with the gear $n^9$ on the cam-shaft, the latter is also prevented from rotation about its axis. In these conditions it follows that an angular motion of the internal gear $n^1$ aforesaid causes an equal angular motion of the unit comprising the intermediate gear $n^8$, cam-shaft $f$ and frame $b$. During this period the spherical roll $d^2$ on the diamond carrier $d$ is clear of the master pieces $m$ and as the cam-shaft is prevented from rotation, no rectilinear component motion can take place.

The means for locking the intermediate gear $n^8$ during the period C and means above referred to, for providing an external force to secure contact, between the cams $i$, $j$ controlling the angular component, and their respective rolls $k$, $l$ in the housing during the periods A and B, are combined.

For these purposes the external force may be created by means of a spring and applied by means of a steel tape connected therewith. According to the arrangement shown in Figures 6 and 7 a steel tape $n^{16}$ connected with one end of a spring $n^{10}$ tends to turn a sleeve $n^{11}$ co-axially arranged with respect to the intermediate gear $n^8$ in a clockwise direction and to press the said sleeve against a fixed stop $n^{12}$, Figure 10, integral with the frame $b$ aforesaid. The other end of the spring $n^{10}$ acts against one arm of a lever $n^{13}$ fulcrumed in said frame. A second steel tape $n^{14}$ connected with the other arm of said lever tends to rotate the intermediate gear $n^8$ in an anticlockwise direction and to press it against a stop $n^{15}$, Figure 9 carried by the said sleeve $n^{11}$. The arrangement is such that in the absence of any counteracting forces exceeding the force of the said spring $n^{10}$ the intermediate gear $n^8$ is locked in a central position by contact between the sleeve $n^{11}$ and the stop $n^{12}$ on the frame $b$, and by contact between the intermediate gear $n^8$ and the stop $n^{15}$ on the sleeve $n^{11}$. A clockwise force exceeding the force of the said spring $n^{10}$ and acting on the intermediate gear $n^8$ will give this gear an angular motion in the same direction and will interrupt the contact between the intermediate gear $n^8$ and the sleeve $n^{11}$. Similarly, an anticlockwise force exceeding the force of the said spring and acting on the intermediate gear $n^8$ will move the latter in the same direction and will interrupt the contact between the sleeve $n^{11}$ and the stop $n^{12}$ on the frame $b$.

When during period C of the profile producing process neither of the cams $i$ or $j$ which are responsible for the angular component motion, is in contact with its respective roll $k$, $l$ on the frame, a rotation of the latter meets no appreciable resistance, the force acting between the internal gear $n^1$ and the intermediate gear $n^8$ equal to this resistance being very small and not exceeding the force exerted by the aforesaid spring $n^{10}$ and tapes. During this period of the profile generating process the intermediate gear $n^8$ is therefore locked by spring $n^{10}$ against rotation in the manner above described and the frame $b$ rotates simultaneously with the internal gear $n^1$.

This simultaneous angular motion of the frame and internal gear $n^1$ continues until one of the cams $i$ or $j$ on the cam-shaft comes into contact with its respective roll $k$ or $l$ on the frame when further rotation of the latter is thereby prevented. The driving pressure between the internal gear and the intermediate gear, however, continues and, when it exceeds the pressure of the spring $n^{10}$ associated with the steel tapes, the intermediate gear $n^8$ and cam-shaft are forced to rotate and the cam-controlled period of the profile generating process begins, or is resumed. The pressure between the internal gear $n^1$ and the intermediate gear $n^8$ acting as an external force on the frame $b$ secures contact between the cams $i$, $j$ which are responsible for the angular component motion, and their respective rolls $k$, $l$ on the housing.

If desired, a profile generating process consisting of an angular component motion of the frame only can be derived from method (A) by using cams having a circular portion concentric with the axis of the cam-shaft. This method, however, can only be employed for small angular motions of the frame. With method (C) i. e. when angular motion is not controlled by cams an angular motion 120° or more can be produced.

No special mechanical means is required for method (D), that is to say, when formed diamonds are used to produce profile portions the same shape as the diamonds.

Whenever two profile portions each produced by one of the methods (A), (B) or (C) above described intersect each other angularly and a concave circular arc is required to connect them at a tangent to both, a spherical diamond with a radius equal to that of the circular arc is employed. The path of the centre of the diamond is in this case composed of two portions which are equidistant to the angularly intersecting profile portions.

From the foregoing description it will now be seen that each portion of the desired profile is determined by different means which can be set and adjusted independently of one another. The portions of the profile produced according to method (A) are determined by cams $i$, $j$ cooperating with rolls $k$, $l$ or their equivalent on the housing; the portions produced in accordance with the pantograph method (B), by the master pieces $m$; the portions produced in accordance with method (C) by the distance of the diamond point $d^3$ from the axis about which the frame $b$ oscillates; and the portions produced according to method (D) by the form of the diamond tool.

By using appropriate cams and master pieces the mechanism herein described can be used for the production of an infinite range of composite profiles. A large variety of composite profiles can, however, be produced by using one standard set of cams and master pieces with simple circular and rectilinear outlines by varying the setting of the cams and the members co-operating with them and by varying the setting of the master pieces and of the diamond tool itself. This provision for adjustment makes it possible to eliminate errors checked on the generated profile by mere re-adjustment of the setting and without altering the form of the generating and forming elements, i. e. the master pieces and the cams and their co-operating members.

Method (A) of the profile generating process, i. e. the control of the angular and rectilinear components by cam action, is preferably used for the main part of the profile the accuracy of which is most important, such as, for example, that part of the operative surface of a grinding wheel which forms the flanks of a screw thread. This method can also be employed for generating adjoining portions of the main profile, for instance circular connection arcs or chamfers between the flanks and the top and bottom profile portions.

In order to ensure the maximum degree of accuracy the cams used for producing the main part of the profile have outlines which can be ground and lapped with a high degree of precision. For this purpose the cam outline is either circular or rectilinear. In order to obtain cam action with cams having a circular outline they are set eccentrically to their axes of rotation. It can be demonstrated by mathematical analysis that by varying the amount of eccentricity and the angular setting of cams of this kind and by varying the setting of the elements with which they co-operate, a variety of profiles having constant or variable curvature can be produced with sufficiently close approximation to the prescribed profile, the range of variation obtained in this way including almost every practically occurring profile.

In the herein described construction the means employed for varying the setting may be as follows:—

(1) For the variation of the eccentricity of the circular cams $i$, $j$ responsible for the angular and rectilinear component motions, a slip gauge combination $i^2$, may be used between the cam $i$ and a stop $i^3$, on a cam-carrying plate $i^4$, concentric with the camshaft, Figure 1. A similar slip gauge combination may also be used between the cam $j$ and a stop (not shown) on a cam carrying plate $j^4$ arranged concentric with the cam shaft.

(2) For the angular setting of the cams the plates $i^4$, $j^4$ carrying them are adjusted angularly with respect to fixed plates $i^5$, $j^5$ on the cam shaft. In this way the relative angular positions of the cams responsible for the angular component motion of the profile generating process, and of the cam $g$ responsible for the rectilinear component thereof, may be varied at will.

(3) The angular setting relative to the housing $a$ of the rolls $k$, $l$ with which the cams $i$, $j$ producing the angular component motion cooperate may be obtained by mounting the rolls on plates $k^1$, $l^1$, Figure 5, carried by rings $k^2$, $l^2$, Figure 1, which can be set by means of a worm and worm gear combination $k^3$, $l^3$ or in any other suitable manner relative to the housing and clamped in their adjusted positions.

(4) For radial setting of the rolls $k$, $l$ a slip gauge combination $k^4$, $l^4$ may be placed between stops on the rings $k^2$, $l^2$ and stops on the roll-carrying plates $k^1$, $l^1$, Figure 5.

(5) The position of the diamond carrier $d$ relatively to a given position of the cam shaft $f$ may be varied by introducing a slip gauge combination $h^4$ between the contact pin $h^2$ and a flat surface on the intermediate member $h$, these members being held together by springs $h^3$, Figure 4.

Auxiliary adjustments may be made by:

(6) Varying the setting of the diamond point in the direction of the axis of the diamond $d^3$, and (7) By varying the angular settings of the diamond-holding bracket relatively to the main body of the diamond carrier $d$.

Of the various settings above enumerated the first determines the curvature of the profile; the second and fourth are responsible for the curvature along a given profile; the third accounts substantially for the pressure angle, whilst the fifth provides a further possibility of closer approximation to the prescribed profile. Settings 6 and 7 are not usually used to vary the main setting which is generally effected by settings 1—5.

In the construction shown the eccentricity of cam $g$ is constant and only a limited number of angular settings of this cam relatively to the cam-shaft $f$ are available by the locating pin $g^1$ entering one of a series of holes in $g$, Figure 1. Should it, however, be necessary for certain purposes, the eccentricity of cam $g$ could be varied by means similar to that employed for cams $i$ and $j$.

The operative surface of the cam $g$ which is responsible for the rectilinear component motion can be of simple or composite form according to the profile to be produced.

Instead of using slip gauge combinations as above described the settings can be effected by any other appropriate mechanical or optical means.

When method (A) is used for generating adjoining portions to the main profile portion, suitable non-circular cams are required to produce the arcs or chamfers. For this purpose the cams $i$, $j$ responsible for the angular component motion may be made with a composite outline comprising a circular cam part for the main profile and a suitable non-circular cam part $i^6$, $j^6$ Figure 5, for the connecting portion of the profile. Usually a high degree of accuracy for these connecting portions is not necessary. Circular arcs as connecting profile portions should be tangential to the main portions. For this purpose the cam employed for producing circular portions of the profile start with a circular outline having the same radius as the circular cams $i$, $j$, and are co-axially arranged with respect thereto. By varying the angular position of these special cams $i^6$, $j^6$ relative to the main cam the starting point of the adjoining profile portion on the main profile portion can be varied as desired.

Profiles consisting of two main profiles can be generated in accordance with method (A) by using two different circular main cams, such as $i$, $j$ which can be set independently of one another.

The pantograph method (B) is preferably for producing rectilinear profile portions, such as the top and bottom of screw thread profiles and chamfers the accuracy of which need not be quite so high as that required for the main profile portions.

Figure 3:
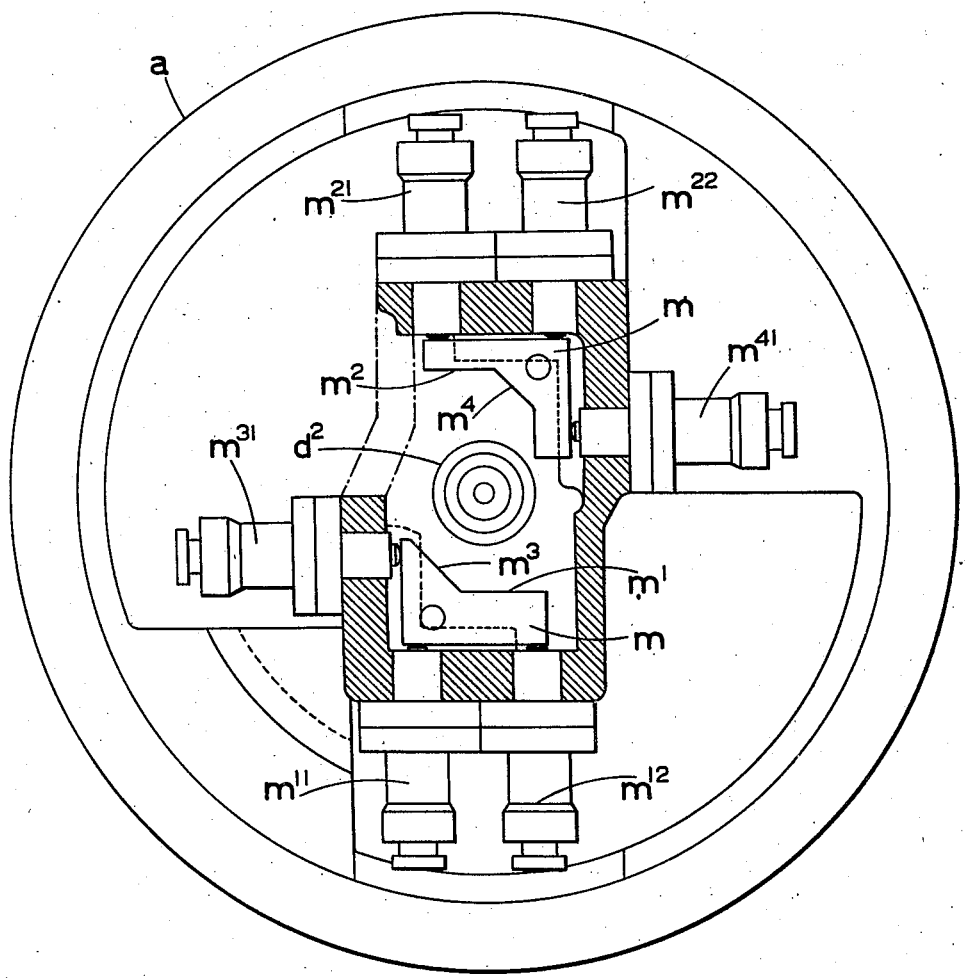
Figure 3 is a transverse sectional view on the line 3—3 of Figure 1.

In the case where, for example, it is desired to dress or form the operative surface of a grinding wheel for producing or finishing screw threads, the top and bottom portions of the thread profile are produced by straight edges $m^1$, $m^2$ on the master pieces, Figure 3. These edges can be simultaneously set to give the correct depth of thread by means of micrometer screws $m^{11}$, $m^{12}$ and $m^{21}$, $m^{22}$. A differential setting of these screws will correct any errors in the angular positions of these profile portions. Other methods of setting which will give a linear and an angular adjustment may be employed, if desired.

The master pieces may also include other straight edges $m^3$, $m^4$ for producing chamfers the starting point of which can be set by micrometer screws $m^{31}$, $m^{41}$. Chamfers of different angles would require different master pieces. Universal master pieces can, however, be provided in which provision is made for adjustment of the angle between the straight edges $m^1$ and $m^3$ and between $m^2$ and $m^4$.

For that period of the profile generating process in which an angular motion only is required, as in method (C) the only setting required is that of the diamond point in the direction of the axis of the diamond tool $d^3$.

As herein described the improved mechanism is applicable for general purposes in the production of a large range of different profiles. For special purposes, however, the said mechanism can be simplified.

In order that the operation of the mechanism in producing a screw thread profile may be clearly understood reference is made to the diagrams, Figures 12 to 17.

Figure 12:
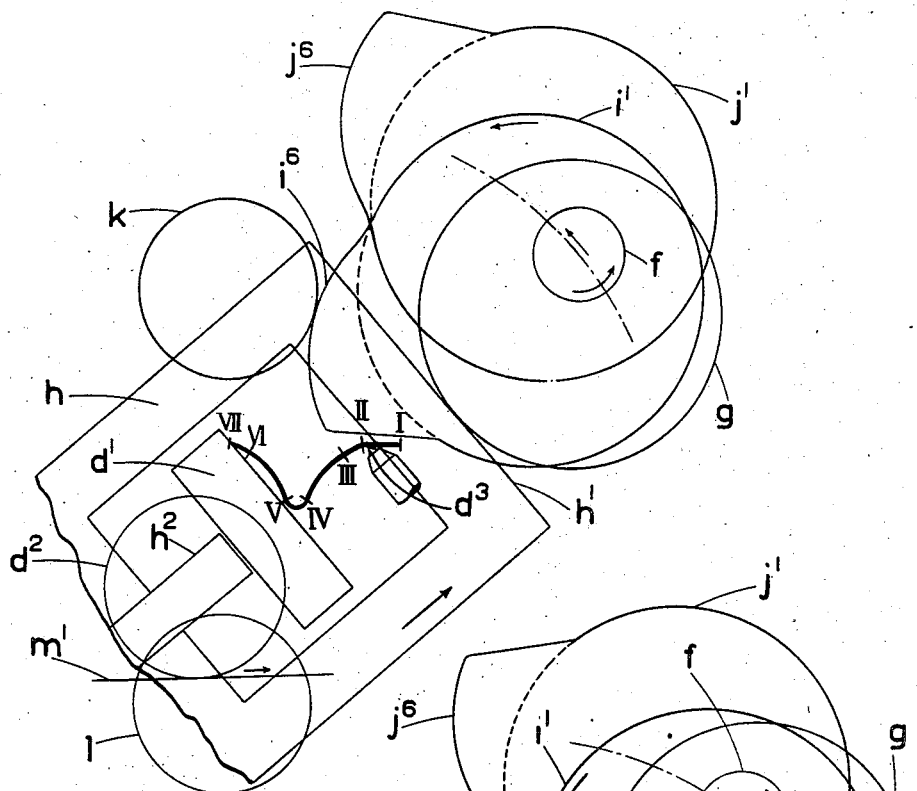

Figure 12 shows the relative positions of the various elements of the mechanism during the production of the portion I—II of the profile. In this case the pantograph method B is employed, the angular component motion being controlled by the roll $k$ and the profile $i^6$ of cam $i$ and the rectilinear component by contact of the spherical roll $d^2$ on the diamond carrier with the master piece $m^1$. During this part of the profile generating process contact between pin $h^2$ on intermediate member $h$ and pin $d^1$ on the diamond carrier is interrupted owing to the co-action between the roll $d^2$ and the master piece $m^1$.

Figure 13:
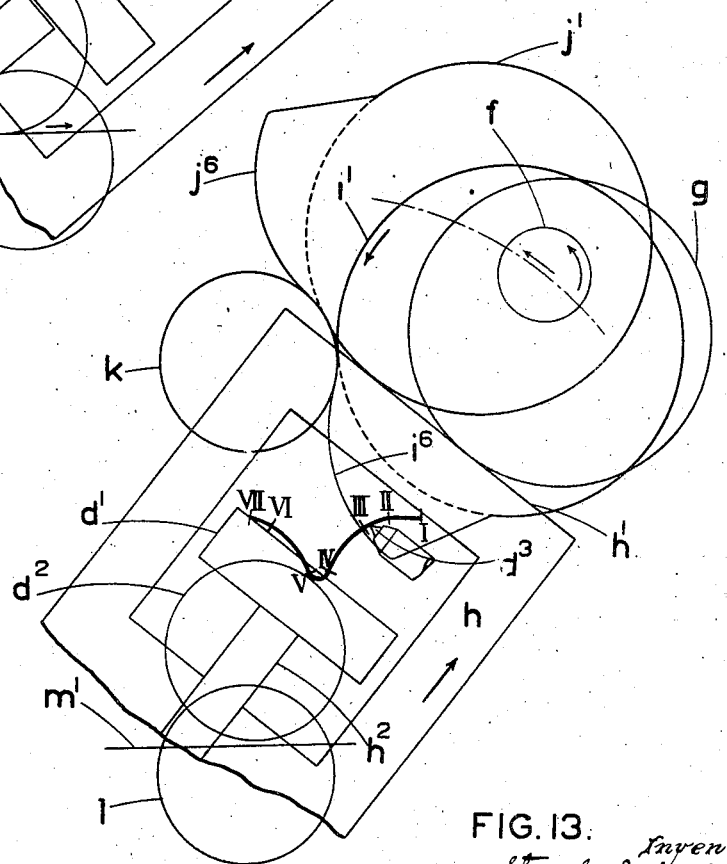

The portion II—III of the profile, Figure 13 is produced by cam action according to method A. During this period the angular component motion is still controlled by the roll $k$ and the cam profile $i^6$ but the rectilinear component is now controlled by contact between cam $g$ and the edge $h^1$ of the intermediate member $h$ and between the contact pin $h^2$ on the latter and the pin $d^1$ on the diamond carrier $d$, contact between the roll $d^2$ and master piece $m$ being, therefore, interrupted.

Figure 14:
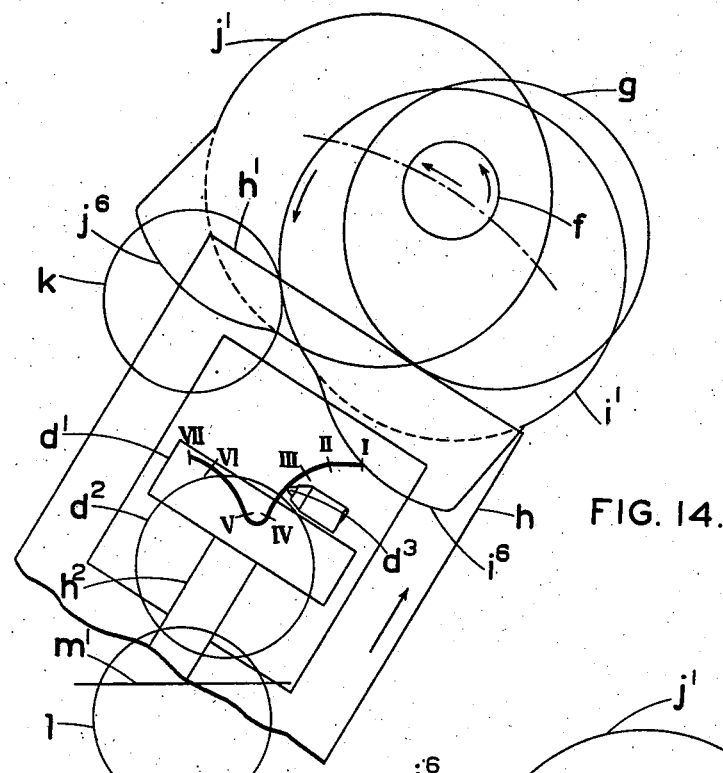

For the main portion III—IV of the profile, Figure 14, the method A is still employed but during this part of the profile forming process the angular component motion is controlled by the roll $k$ and the circular portion $i^1$ of cam $i$. The rectilinear component motion is, however, still produced by the elements $g$, $h^1$, $h^2$, $d^1$.

Figure 15:
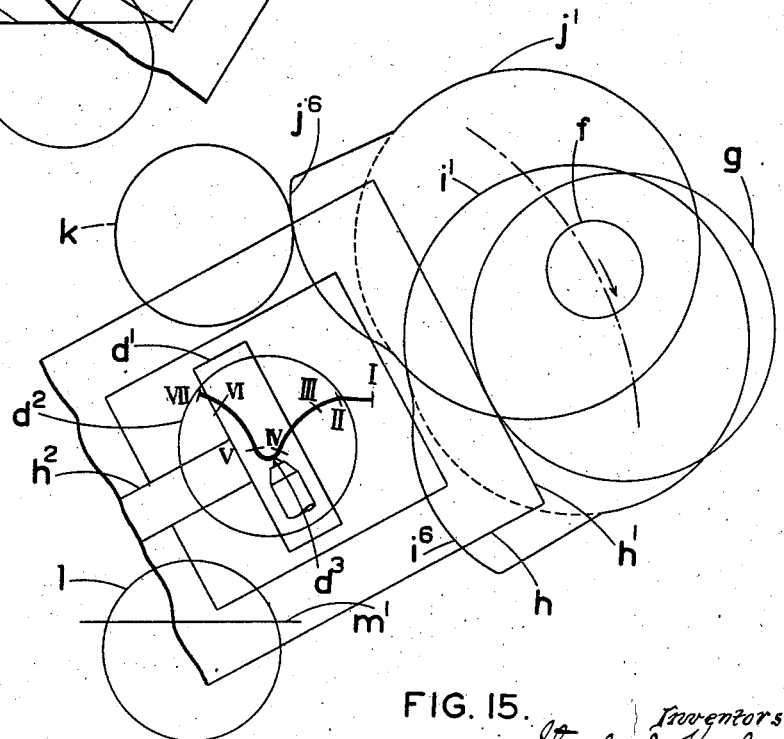

For the crest portion IV—V of the profile, Figure 15, the method C is employed, that is to say, an angular motion only is used by rotating the frame with the cam shaft $f$ having all cams locked. The only contact in this case is between cam $g$ and edge $h^1$ of $h$ and between contact pin $h^2$ and pin $d^1$ on the diamond carrier.

For the production of the main profile portion V—VI on the other flank, Figure 16, the method A is again employed, the angular component motion being now controlled by the other roll $l$ and cam $j^1$, whilst the rectilinear component motion is still controlled by contacts between cam $g$ and the edge $h^1$ of $h$ and between contacts pin $h^2$ and the pin $d^1$ on the diamond carrier.

Figures 16, 17:
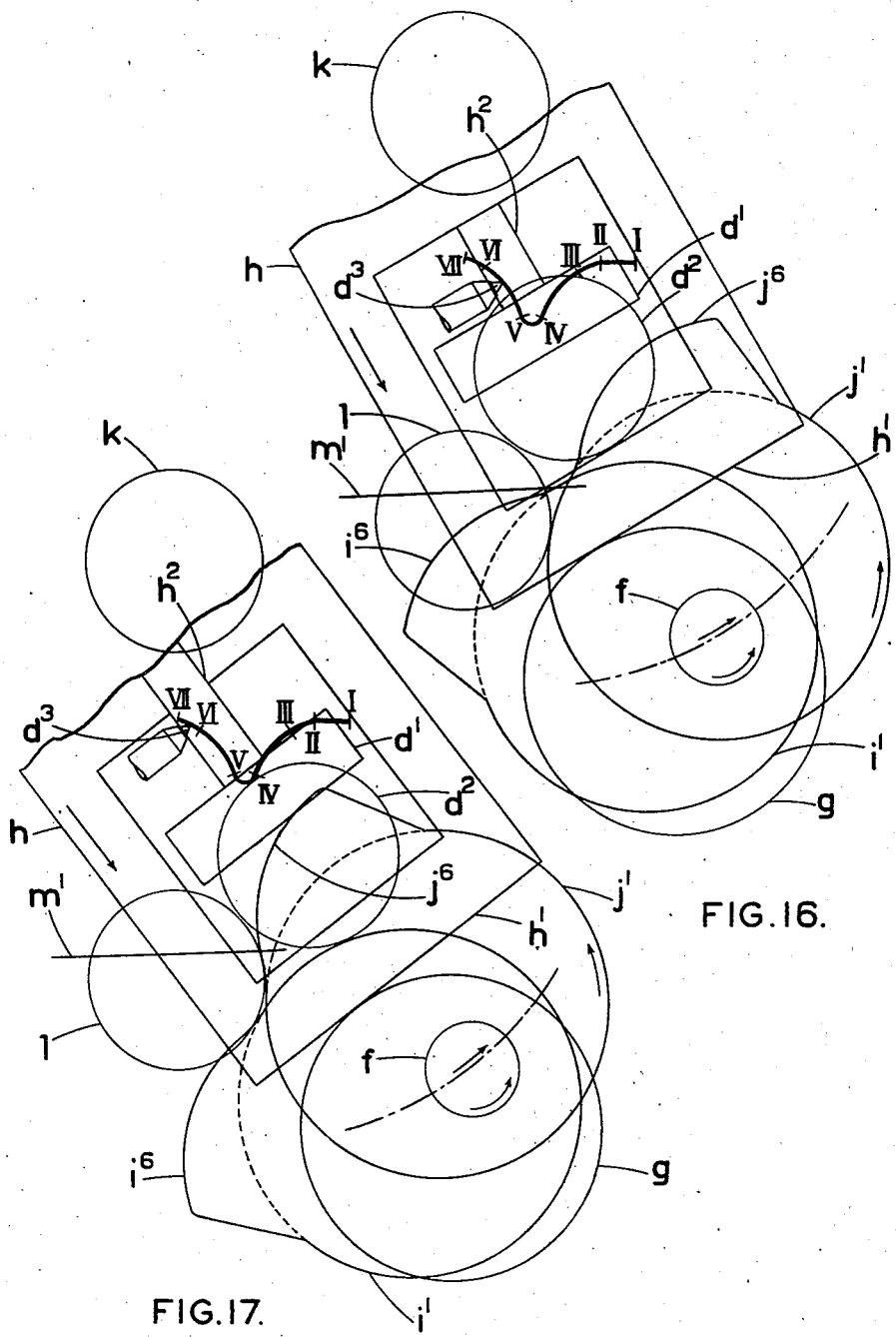

Method A is still employed for the production of the profile portion VI—VII, Figure 17, the angular component motion being controlled, however, by the roll $l$ and the non-circular portion $j^6$ of the cam $j$. Contacts $g$, $h^1$, and $h^2$, $d^1$, continue to control the rectilinear motion.

We claim:

1. Profile generating mechanism of the character described, comprising a fixed housing, a frame having an oscillatory motion therein, a cam-shaft rotatably mounted in said frame, circular cams adjustably mounted on said cam-shaft for controlling the oscillations of said frame, a diamond-carrying member having an oscillatory motion in said frame in a plane at an angle to the plane of oscillation of said frame, and means for controlling the oscillations of said diamond-carrying member.

2. Profile generating mechanism of the character described, comprising a fixed housing, circular and rectilinear surfaces adjustably mounted therein, a frame having an oscillatory motion in said housing, a cam-shaft rotatably mounted in said frame, a set of circular cams adjustably mounted on said cam-shaft and co-operating with said surfaces for controlling the oscillations of said frame, a diamond-carrying member pivotally mounted in said frame, a main circular cam on said cam-shaft, and means operated by said main cam for imparting an oscillatory motion to said diamond-carrying member in said frame in a plane at right angles to the plane of oscillation of said frame.

3. Profile generating mechanism of the character described, comprising a fixed housing, circular and rectilinear surfaces adjustably mounted therein, a frame having an oscillatory motion in said housing, a cam-shaft rotatably mounted in said frame, a set of circular cams adjustably mounted on said cam-shaft and co-operating with said surfaces for controlling the oscillations of said frame, a diamond-carrying member pivotally mounted in said frame, a main circular cam on said cam-shaft, and means operated by said main cam for imparting an oscillatory motion to said diamond-carrying member in said frame a set of master-pieces adjustably mounted in said housing for controlling the oscillatory motion of said diamond-carrying member in said frame, and means for interrupting the action of said main cam.

4. Profile generating mechanism of the character described, comprising a fixed housing, a frame having an oscillatory motion therein, a cam-shaft rotatably mounted in said frame, circular cams adjustably mounted on said cam-shaft for controlling the oscillations of said frame, means for varying the angular positions of said cams and for adjusting the amount of their eccentricity with respect to the rotational axis of said cam-shaft, a diamond-carrying member having an oscillatory motion in said frame in a plane at an angle to the plane of oscillation of said frame, and means for producing and for controlling the oscillations of said diamond-carrying member.

5. Profile generating mechanism of the character described, comprising a fixed housing, circular and rectilinear surfaces adjustably mounted therein, a frame having an oscillatory motion in said housing, a cam-shaft rotatably mounted in said frame, a set of circular cams adjustably mounted on said cam-shaft and co-operating with said surfaces for controlling the oscillations of said frame, a diamond-carrying member pivotally mounted in said frame, a main circular cam on said cam-shaft, means for varying the angular position of said main cam on said cam-shaft, and means operated by said main cam for imparting an oscillatory motion to said diamond-carrying member in said frame in a plane at right angles to the plane of oscillation of said frame.

6. Profile generating mechanism of the character described comprising a fixed housing, a frame rotatably mounted therein, a cam-shaft rotatably mounted in said frame, means for rotating said cam-shaft, contact surfaces adjustably mounted in said housing, circular cams adjustably mounted on said cam-shaft and adapted to co-act with said contact surfaces to impart an oscillatory motion to said frame, a diamond-carrying member pivotally mounted in said frame, and means for oscillating said diamond-carrying member in a plane at an angle to the plane of oscillation of said frame.

7. Profile generating mechanism of the character described comprising a fixed housing, a frame rotatably mounted therein, a cam-shaft rotatably mounted in said frame, an internally toothed gear member rotatably mounted in said housing co-axially with said frame, a gear member fixed to said cam-shaft, an intermediate gear member rotatably mounted in said frame and in constant mesh with said internally toothed gear member and with the gear member on said cam-shaft, means for rotating said internally toothed gear member, rollers adjustably mounted in said housing, circular cams adjustably mounted on said cam-shaft and adapted to co-act with said rollers, to impart an oscillatory motion to said frame, a diamond carrying member pivotally mounted in said frame, and means for oscillating said diamond-carrying member in a plane at an angle to the plane of oscillation of said frame.

8. Profile generating mechanism of the character described comprising a fixed housing, a frame rotatably mounted therein, a cam-shaft rotatably mounted in said frame, circular cams adjustably mounted on said cam-shaft for controlling the angular motion of said frame, driving means for said cam-shaft, yielding means for locking said cam-shaft against rotation when the resistance offered to the rotation of said cam-shaft by said driving means is less than the influence of said yielding locking means, a diamond-carrying member pivotally mounted in said frame and means for oscillating said diamond-carrying member in a plane at an angle to the plane of oscillation of said frame.

9. Profile generating mechanism of the character described comprising a fixed housing, a frame rotatably mounted therein, a cam-shaft rotatably mounted in said frame, an internally toothed gear member rotatably mounted in said housing co-axially with said frame, a gear member fixed to said cam-shaft, an intermediate gear member rotatably mounted in said frame and in constant mesh with said internally toothed gear member and with the gear member on said cam-shaft, means for rotating said internally toothed gear member, yielding means for preventing rotation of said intermediate gear member, rollers adjustably mounted in said housing, circular cams adjustably mounted on said cam-shaft and adapted to co-act with said rollers to impart an oscillatory motion to said frame against the influence of said yielding locking means a diamond-carrying member pivotally mounted in said frame and means for oscillating said diamond-carrying member in a plane at an angle to the plane of oscillation of said frame.

10. Profile generating mechanism of the character described comprising a fixed housing, a frame rotatably mounted therein, means for oscillating said frame, a diamond-carrying member pivotally mounted in said frame, a cam-shaft rotatably mounted in said frame, means for rotating said cam-shaft, a cam on said cam-shaft, an intermediate member slidably mounted on said frame, a contact pin carried by said intermediate member and engaging said diamond-carrier, and a spring arranged to hold said intermediate member against said cam and the contact pin in contact with said diamond-carrier.

11. Profile generating mechanism of the character described comprising a fixed housing, a frame rotatably mounted therein, means for oscillating said frame, master pieces adjustably mounted in said housing, a member pivotally mounted in said frame, a roller at one end of said member adapted to co-operate with said master-pieces, a diamond-carrying bracket adjustably attached to the other end of said member, and means for oscillating said member in a plane at an angle to the plane of oscillation of said frame.

STANLEY J. HARLEY.
GEORGE OLAH.